United States Patent [19]
Fickelscher et al.

[11] 3,982,765
[45] Sept. 28, 1976

[54] PISTON PUMP

[75] Inventors: Kurt Gerhard Fickelscher; Christian Michael Anders, Frankenthal, Germany

[73] Assignee: Balcke-Durr Aktiengesellschaft, Ratingen, Germany

[22] Filed: Mar. 28, 1975

[21] Appl. No.: 562,822

[30] Foreign Application Priority Data
Apr. 2, 1974 Germany............................ 2415848

[52] U.S. Cl................................. 277/53; 277/106
[51] Int. Cl.² ...................... F16J 15/44; F16J 15/18
[58] Field of Search ............ 277/53, 106, 110, 113, 277/114

[56] References Cited
FOREIGN PATENTS OR APPLICATIONS
172,235   8/1906   Germany............................ 277/106

*Primary Examiner*—Robert I. Smith
*Attorney, Agent, or Firm*—Herbert L. Lerner

[57] ABSTRACT

A piston pump for displacing a fluid comprises an adjustable stuffing box, at least one packing ring disposed adjacent to the stuffing box, the fluid exerting pressure on, and the stuffing box abutting against the packing ring, a stuffing box housing for holding the stuffing box, a plunger disposed within the stuffing box and in contact with the packing ring, a throttle ring, a compression spring coaxial with the plunger and disposed between the stuffing box and the throttle ring, the stuffing box engaging the throttle ring telescopically, a clearance remaining therebetween, and a limit stop for making contact with the throttle ring disposed on the stuffing box housing.

7 Claims, 6 Drawing Figures

PISTON PUMP

The invention relates to a piston pump for a fluid having an adjustable stuffing box with packing rings and a plunger, a spring being disposed coaxially with the plunger pressing against the packing rings on the side of the fluid.

The piston pump serves for the supply of incompressible fluids from spaces or volumes having a low pressure to spaces having a high pressure by the displacement action of a reciprocating piston or plunger. It is suitable for hydraulic plants, for feeding of a boiler, for application in chemical processes and for use in nuclear power plants.

A pressure— and suction valve is disposed on the side of the fluid of the piston pump. During operation a pulsating pressure occurs on the side of the fluid. It is the task of the stuffing box to seal the operating space, i.e. the cylinder, with respect to the housing, or the external space. It comprises, as is generally known, individual packing rings or packing-ring combinations. The space available for insertion of the stuffing box is generally limited in the direction of operation by a stuffing-box nut, which must also be able to tighten the stuffing box-packing during wear and consequently during greater leakage.

In several applications, particularly when using the piston pump in nuclear power plants, a very long service life of the packing is required, since the operating personnel is exposed to a high degree of radiation danger when adjusting the packing; a stuffing-box spring is therefore used to avoid adjustment thereof. This spring is disposed on the side of the fluid or the pressure, and exerts pressure in a direction equal to that acting on the stuffing box packing. The use of this spring has the following disadvantages:

1. In view of the available insertion space it cannot be of a size for the force of the spring to hold the individual packing rings absolutely and sealingly tight together. During an inward movement of the packing the force of the spring is consequently generally too small to prevent a strong motion of the packing rings in an axial direction.

2. If the spring is too strong and the stuffing-box packing is heated, the spring cannot expand and as a result of any wedging or freezing in a bore, the spring dries up, i.e. becomes overheated. and thus destroyed.

3. The stuffing box packing breathes during respective application and removal of the pulsating pressure, i.e. it moves along its length. This may result under certain circumstances in cavitations in the packing space and/or on the displacement piston.

It is accordingly an object of the invention to obtain a long service life for a piston pump of the aforesaid kind, without the packing having to be adjusted.

It is therefore proposed, according to the invention, that the spring be disposed between a stuffing box and a throttle ring, that the stuffing box and the throttle ring engage each other telescopically leaving a clearance or a gap therebetween, that the stuffing box and/or the throttle ring be respectively formed with axial recesses or bores, and that the stuffing box abut on one hand against the packing rings, and on the other hand that there be disposed on the stuffing-box housing a limit stop for engagement of the throttle ring.

Upon the throttle ring and the stuffing box impacting on each other there preferably occurs a throttling action through the throttling gap, i.e. the insertable use of the combined stuffing box, spring and throttling ring constituting a hydraulic damping means. This in turn permits the use of such a low stuffing-box spring-force that a length increase of the stuffing-box packing during heating is permissible. The spring force of the stuffing box is, however, so large, that any strong breathing and/or motion of the stuffing-box packing is simultaneously prevented. These apparently contradictory requirements can be reconciled since an increase in length of the stuffing-box packing during heating occurs only slowly, whereas the breathing of the stuffing box packing takes place at the stroke frequency. The diverging motion of the stuffing box and the sealing ring meets with very little resistance in view of the axial recesses or bores with which the stuffing box or the throttle ring are formed.

The intended throttle action of the throttle gap during impact of the throttle ring and the stuffing box can be increased if the throttling gap is formed with additional throttling elements, which may take the form of a thread, or of a labyrinth sealing.

The invention does, of course, also encompass a kinematic reversal of the throttling ring and the stuffing box. In a preferred version of the invention the stuffing box faces the plunger; in that case it can preferably also carry a guidance element therefor.

The stuffing box is preferably provided with a limit stop engaging or impacting with the throttling ring on a side facing away from the spring. An easier insertion is thereby advantageously accomplished, since the extension of the spring is limited by the throttle ring coming to a rest against a stop, for example a safety ring or guard. The stuffing box, the spring and the throttling ring can be inserted in an assembled position into the stuffing-box housing. Other features which are considered as characteristic for the invention are set forth in the appended claims.

Although the invention is illustrated and described herein as embodied in piston pump, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
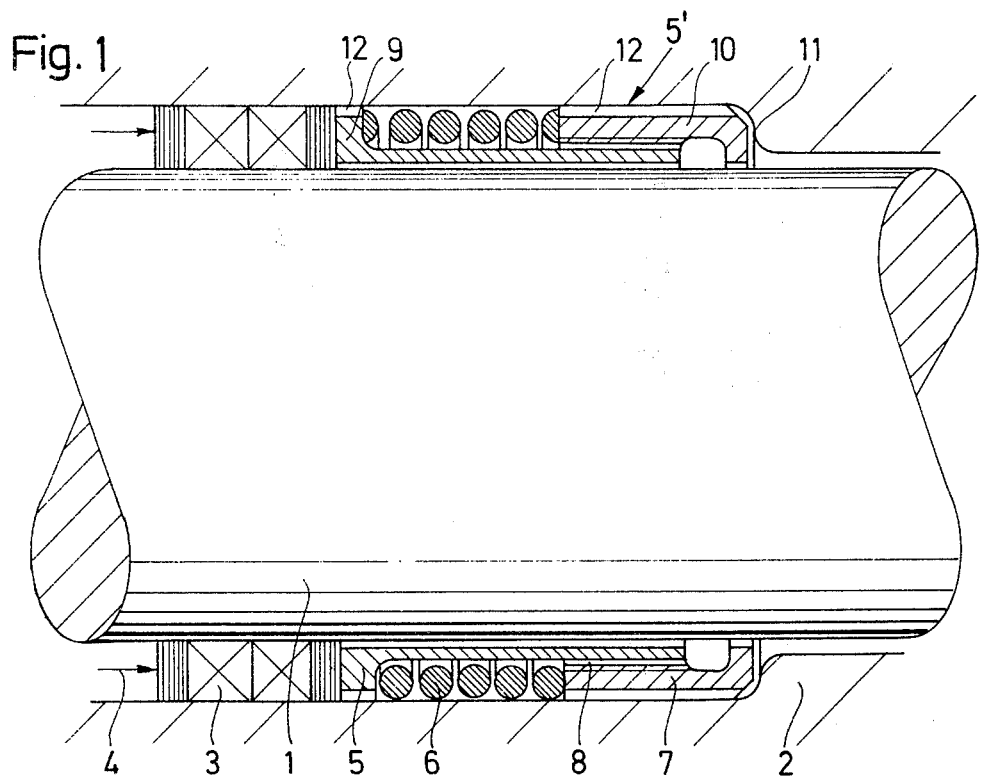
FIG. 1 shows an adjustable stuffing box.
Figure 2:
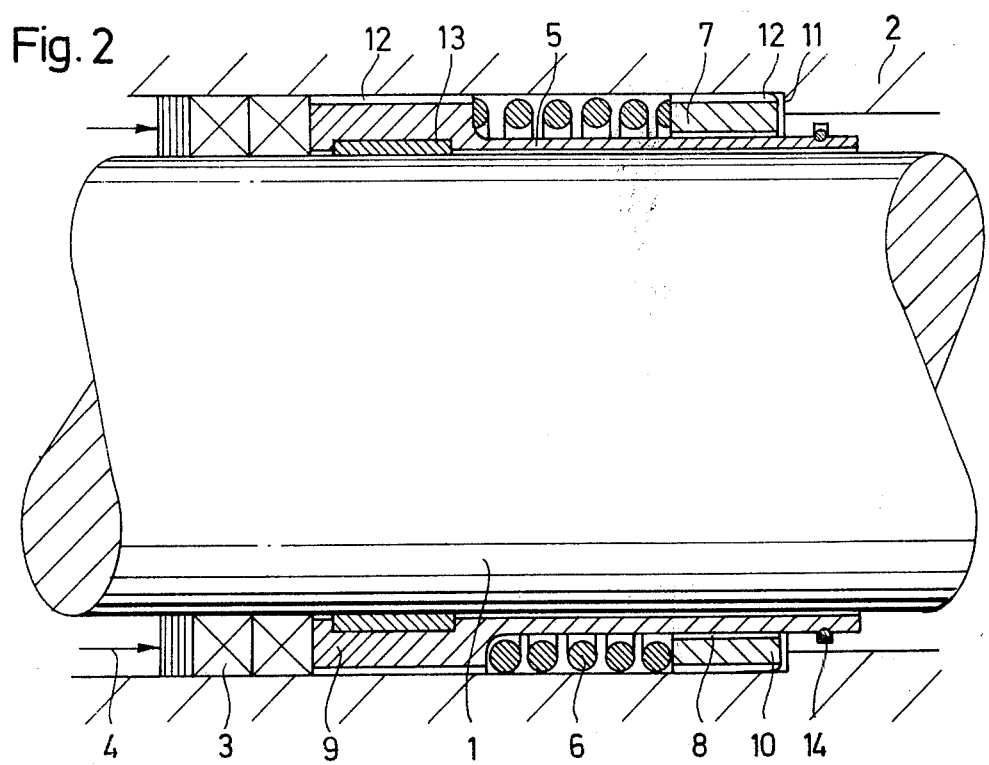
FIG. 2 shows a stuffing box with guidance elements for the plunger.

In the embodiments shown in FIGS. 1 and 2 there is disposed to the right of a plunger 1 a fluid, i.e. an operating space with valves. The plunger 1 is guided in a stuffing-box housing 2. Between the plunger 1 and the stuffing-box housing 2 there are disposed, on one hand, a plurality of packing rings 3 which, as shown symbolically by the arrows 4, are secured to the stuffing-box housing 2 by a counter pressure, for example a safety device or guard, and on the other hand a packing adjustment device comprising a stuffing box 5, a spring 6 and a throttle ring 7. The complete stuffing box or stuffing box assembly is designated generally by numeral 5' while stuffing box 5 refers to the gland or sleeve itself. A throttling gap or clearance 8 is formed between the stuffing box 5 and the throttle ring 7. The stuffing box 5 is abutting on one hand with a shoulder 9 on the packing rings 3, and the throttle ring 7 is abutting with a shoulder 10 against a limit stop 11 of the stuffing-box housing 2. The throttling ring 7 and the stuffing box 5 are formed on their respective external sides with axial recesses 12.

The packing adjustment means operates as follows:

The piston pump travels under full load against the pressure of the fluid supply. Upon displacement of the fluid supply a counter pressure is applied against the packing rings 3. The latter therefore take up the smallest possible volume. The stuffing box 5 and the throttle ring 7 are displaced with respect to one another by the spring 6 until the stuffing box 5 or the throttle 7 impact on the packing rings 3 or the limit stop 11 of the stuffing-box housing 3 respectively. Upon disengagement and travel in opposite directions of the stuffing box 5 and the throttle ring 7 the throttling action of the throttling gap or clearance 8 is suppressed by the recesses 12 formed on the respective external sides of the stuffing box 5 and the throttle ring 7. In lieu of the axial recesses it is also possible that a shoulder 9 of the stuffing box 5 and the throttling ring 7 be formed with respective bores.

If a pressure release occurs as a result of a suction stroke then the packing rings 3 will tend to occupy a larger volume. A pressure is applied to the packing-adjustment means causing the fluid supply to be pressed through the throttling gap or clearance between the stuffing box 5 and the throttle ring 7. A return flow of the fluid through the axial recesses 12 is not possible, since the respective top surfaces of the stuffing box 5 and the throttle ring 7 are now disposed adjacent to the packing rings 3 or the limit stop 11 respectively. There now occurs a very slow length increase of the stuffing-box packing or the packing rings 3 respectively, until due to the displacement of the fluid a pressure is again applied to the stuffing box, i.e. the movement of the packing is strongly damped. The packing rings 3 again take up the smallest possible volume, the parts of packing adjustment means are again separated from one another by the stuffing-box spring 6, and the whole process is repeated.

Any wear of the packing or the packing rings 3 results in a correspondingly smaller packing volume, the packing adjustment means is therefore lengthened and equalizes in a self-actuating manner any wear of the stuffing box.

If the piston pump travels idly i.e. without any pressure, then the spring 6 stabilizes the packing insert in such a way that the packing rings 3 are compressed. The hydraulic damping prevents any movement of the packing insert during a piston stroke.

FIG. 2 shows a variation of FIG. 1. The insertion side is to the left of the plunger 1 and the fluid side to the right thereof. The stuffing box 5, which may be slightly more elongated than the throttle ring 7, carries a guidance element 13, for example a guidance ring or guard and has on its elongated side a safety ring or guard ring 14. Prior to the insertion of the packing-adjustment means the throttle ring 7 is pressed against the guard ring. During insertion of the packing-adjustment means from the left into the stuffing-box housing 2 the throttle ring 7 is lifted by the guard ring 14. As a result of the protective action of the spring 6 preventing a separation of the respective parts of the packing adjustment means, the insertion thereof is considerably eased.

Figure 3:
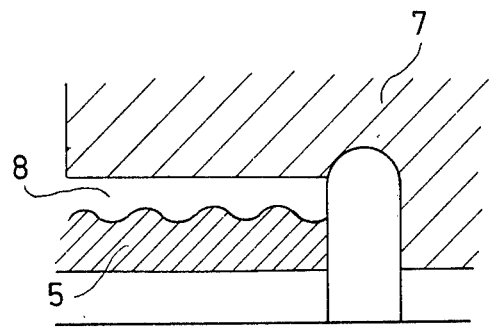
FIGS. 3 to 6 show respective enlargements of FIG. 1 illustrating various versions of the throttling gap taking a thread-type or labyrinth-type form.
Figure 4:
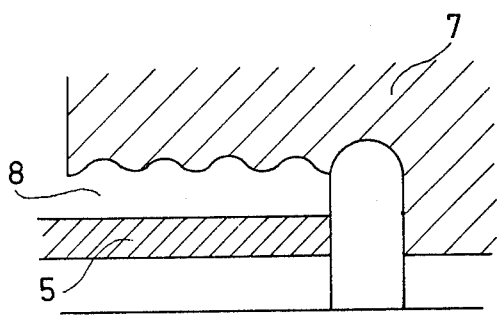
Figure 5:
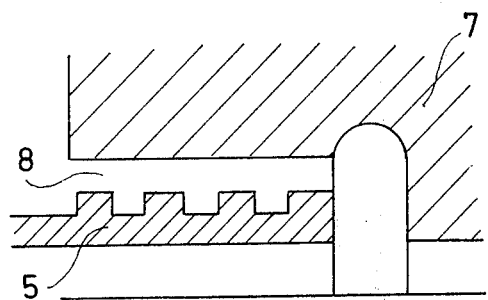
Figure 6:
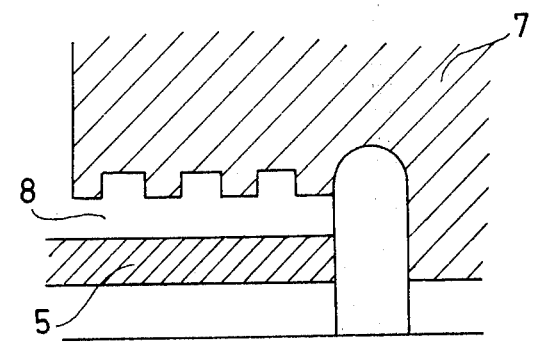

It will be understood that the material of the throttling ring 7 is harder than the material of the stuffing box 5 or vice-versa, to prevent seizing in the throttling gap or clearance 8. A small displacement of the throttle ring 7 from its concentric position vis-a-vis the plunger 1 does not cause any impairment of the packing-adjustment means, since the effective surface of the throttling gap 8 remains constant. FIGS. 3 to 6 show various implementations of the throttling gap using additional parts as throttling elements. FIG. 3 shows the region of the stuffing box 5 adjacent to the throttle ring 7 formed with a thread, and FIG. 4 shows the throttling ring 7 formed with a thread. FIG. 5 shows the region of the stuffing box 5 adjacent to the throttle ring 7 formed with a labyrinth-type sealing and FIG. 6 shows the throttle ring 7 formed with a labyrinth-type sealing.

The packing adjustments means advantageously prevents a movement of the stuffing-box packing and equalizes any stuffing box wear.

What is claimed is:

1. A stuffing box assembly for a piston pump for displacing a fluid comprising:
    an adjustable stuffing box;
    at least one packing ring disposed adjacent to said stuffing box, said fluid exerting pressure on, and said stuffing box abutting against said packing ring;
    a stuffing-box housing for holding said stuffing box;
    a plunger disposed within said stuffing box and in contact with said packing ring;
    a throttle ring;
    a compression spring coaxial with said plunger and disposed between said stuffing box and said throttle ring, said stuffing box and said throttle ring movable telescopically with respect to one another, with a throttling gap remaining therebetween;
    an axial recess formed in at least one of said stuffing box and said throttle ring; and
    a limit stop for making contact with said throttle ring disposed on said stuffing box housing.
2. A stuffing box assembly according to claim 1, wherein said stuffing box is formed with an axial recess.
3. A stuffing box assembly according to claim 1, wherein said throttle ring is formed with an axial recess.
4. A stuffing box assembly according to claim 1, wherein said throttling gap is provided with additional throttling elements.
5. A stuffing box assembly according to claim 4, wherein said throttling elements have the form of a thread.
6. A stuffing box assembly according to claim 4 wherein said throttling elements have the configuration of a labyrinth.
7. A stuffing box assembly according to claim 1 further comprising a second limit stop disposed on a side of said stuffing box facing away from said compression spring for making contact with said throttle ring.

* * * * *